(12) United States Patent
Khan et al.

(10) Patent No.: US 7,619,977 B2
(45) Date of Patent: Nov. 17, 2009

(54) NET-CENTRIC COORDINATION CHANNEL (NCC)

(75) Inventors: Zia R. Khan, Hacienda, CA (US); Ricardo T. Zabat, Fullerton, CA (US)

(73) Assignee: The Boeing Company, Chicago, IL (US)

( * ) Notice: Subject to any disclaimer, the term of this patent is extended or adjusted under 35 U.S.C. 154(b) by 318 days.

(21) Appl. No.: 11/102,296

(22) Filed: Apr. 8, 2005

(65) Prior Publication Data

US 2006/0229080 A1 Oct. 12, 2006

(51) Int. Cl.
*G01R 31/08* (2006.01)
*G06F 11/00* (2006.01)
*G08C 15/00* (2006.01)
*H04J 1/16* (2006.01)
*H04J 3/14* (2006.01)
*H04L 1/00* (2006.01)
*H04L 12/26* (2006.01)

(52) U.S. Cl. .................. 370/236; 370/235; 370/462
(58) Field of Classification Search .............. 370/230, 370/237, 395.5, 210, 252, 254, 255, 230.1, 370/235, 236, 462; 455/41.1
See application file for complete search history.

(56) References Cited

U.S. PATENT DOCUMENTS

| | | | | |
|---|---|---|---|---|
| 6,091,953 A * | 7/2000 | Ho et al. | | 455/433 |
| 2003/0061503 A1* | 3/2003 | Katz et al. | | 713/200 |
| 2004/0022224 A1* | 2/2004 | Billhartz | | 370/338 |
| 2004/0152464 A1* | 8/2004 | Sugaya | | 455/435.1 |
| 2004/0174822 A1* | 9/2004 | Bui | | 370/252 |
| 2005/0063319 A1* | 3/2005 | Kyperountas et al. | | 370/254 |
| 2005/0094585 A1* | 5/2005 | Golden et al. | | 370/310 |
| 2005/0152291 A1* | 7/2005 | Al-Harthi | | 370/277 |
| 2005/0157661 A1* | 7/2005 | Cho | | 370/254 |
| 2005/0239438 A1* | 10/2005 | Naghian | | 455/410 |
| 2006/0084463 A1* | 4/2006 | Yoo et al. | | 455/550.1 |
| 2006/0126524 A1* | 6/2006 | Tateson | | 370/252 |
| 2007/0109989 A1* | 5/2007 | Nakagawa et al. | | 370/328 |

FOREIGN PATENT DOCUMENTS

WO WO 2005/010214 A2 2/2005

OTHER PUBLICATIONS

David J. Goodman, "Wireless Personal Communications Systems", 1997, Addison Wesley Longman, Inc., pp. 278-280.*
Int'l Search Report & Written Opinion PCT/US2006/010459, Aug. 31, 2006, The Boeing Company.
Chen et al., Dynamic Service Negotiation Protocol (DSNP) and Wireless Diffserv, vol. 2, pp. 1033-1038, Apr. 28, 2002, New York, USA.

* cited by examiner

*Primary Examiner*—Edward Urban
*Assistant Examiner*—Christian A Hannon

(57) ABSTRACT

Methods and apparatus are provided for registering an unanticipated node into an ad-hoc network. A communication channel is dedicated as the link between a registry within the network and unanticipated nodes. The dedicated communication link typically comprises primary and secondary frequencies in the RF spectrum. An unanticipated node can be registered "on-the-fly" via the dedicated communication link by identification, authentication, and non-repudiation. The unanticipated node can then interoperate with the network via a standard communication protocol.

10 Claims, 2 Drawing Sheets

NET-CENTRIC COORDINATION CHANNEL (NCC)

TECHNICAL FIELD

The present invention generally relates to network interoperability, and more particularly relates to "on the fly" registration of nodes in an ad-hoc network environment.

BACKGROUND

The interoperability of computer systems and devices is generally a prerequisite for successful communication between systems and devices within a network, and also within a system of networks. Communication networks are currently used in a wide range of applications, including consumer, commercial, government and military, among others, and can range in complexity from relatively simple to highly complex. A few examples of complex communication networks are the Internet, Homeland Security, and military command and control systems.

As computer technology continues to evolve, the perceived ideal of universal interoperability between systems and devices becomes an increasingly desirable objective. The ongoing proliferation of communication devices, such as Personal Digital Assistants (PDAs), robotics, software-defined radios, unmanned aerial vehicles and the like, offers numerous opportunities and challenges for communication interoperability applications. In a battlefield environment, for example, a soldier equipped with a PDA could benefit significantly from target-related information supplied by a remote source such as an unmanned aerial vehicle, or from instructions relayed from a command and control center, in addition to other relevant information from a communication network. In order for this type of coordinated information gathering and distribution to be successful, however, the diverse categories of systems and devices within a communication network must be generally compatible with interoperability standards.

An information based network with a high degree of interoperability between remote assets (nodes) and one or more command and control nodes can be designated a network-centric operation (NCO). In general, an NCO represents the ability of geographically separated entities (nodes) to share information efficiently, to collaborate on tasks, and to synchronize actions within a network-centric environment. For a mobile NCO environment, as for example in a battlefield situation, the ability of a command and control node to interoperate with diverse remote nodes is typically enabled by an a-priori registration in a local network registry of anticipated remote nodes. For a truly dynamic (ad-hoc) mobile network capability, however, it would be advantageous to enable a remote node to enter the NCO environment without an a-priori arrangement. That is, the overall flexibility of an NCO could be significantly enhanced if an unanticipated remote node could enter the NCO environment by registering with the network "on the fly".

Accordingly, it is desirable to provide methods and apparatus to enable a node to enter a network without a-priori registration. In addition, it is desirable that an "on the fly" registration include identification, authentication, and non-repudiation of the entering node during the registration process. Furthermore, other desirable features and characteristics of the present invention will become apparent from the subsequent detailed description and the appended claims, taken in conjunction with the accompanying drawings and the foregoing technical field and background.

BRIEF SUMMARY

According to various exemplary embodiments, devices and methods are provided for entering a node into a network environment without a-priori registration. One exemplary method comprises the steps of allocating a communication channel to act as a dedicated link between the entering node and the network registry, registering the node via the dedicated communication channel link, and deploying the node to interoperate within the network environment. In this embodiment, the allocating step typically comprises dedicating selected primary and secondary frequency channels within the Radio Frequency (RF) spectrum, such as in the Ultra High Frequency (UHF) band. The registering step in this embodiment typically comprises identification, authentication, and non-repudiation of the entering node. Moreover, the deploying step typically comprises scanning, detecting and negotiating the node services via a standard communication protocol such as TCP/Ipv4, for example.

An exemplary embodiment of a network for accommodating the "ad-hoc" registration of an unanticipated node typically comprises a registry within the network and a dedicated communication channel configured to link the network registry with the unanticipated node. In this embodiment, an unanticipated node is registered "on-the-fly" via the dedicated communication channel link, and the unanticipated node is thereafter deployed to interoperate within the network. The dedicated communication channel is typically comprised of a primary frequency and a secondary frequency selected within the Radio Frequency (RF) spectrum, such as in the Ultra High Frequency (UHF) band. The primary frequency is typically used to facilitate connectivity, discovery, routing, registration, and service negotiation. The secondary frequency is typically configured to facilitate overflow and back-up functions.

The "on-the-fly" registration of the unanticipated node with the exemplary network typically comprises identification, authentication, and non-repudiation of the unanticipated node. The subsequent deployment of the unanticipated node to interoperate with the other nodes in the network typically comprises scanning, detecting and negotiating the node services via a standard communication protocol such as TCP/IPv4, for example.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Various embodiments of the present invention pertain to the area of interoperability of computer systems and devices in a network environment. In a typical network-centric operation (NCO), for example, the anticipated remote nodes are generally pre-registered in a local network registry in order to be authenticated before communicating with other nodes (e.g., command and control) in the network: In the case of a dynamic mobile NCO such as a complex military network, the pre-registration requirement can be cumbersome and time-consuming, and will typically limit the flexibility of an ad-hoc type of communication network. Therefore, a scheme for "on-the-fly" node registration is disclosed herein that can enable an unanticipated node to enter an NCO type of network environment without a-priori registration.

Figure 1:
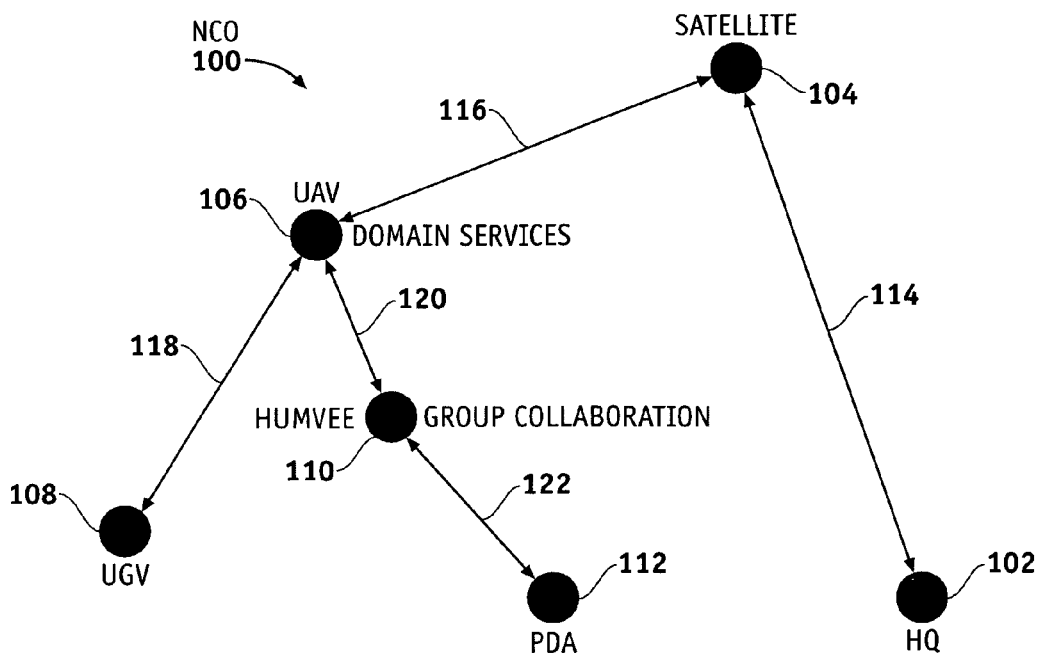
FIG. 1 is an interoperability map of an exemplary network with pre-registered anticipated nodes.

One example of a conventional NCO configuration 100 is illustrated in FIG. 1. In this example, a headquarter node 102 can be designated as the command and control center for NCO 100. Headquarter (HQ) node 102 can be in direct communication with a satellite 104 that is typically configured to provide target and/or other types of surveillance information to headquarter node 102, and to suitably interlink with other ground and/or air-based nodes such as an unmanned aerial vehicle (UAV) node 106. UAV node 106 may be configured as a domain services node in order to provide a common domain pre-registration directory service for the known (anticipated) nodes in the network. Such anticipated nodes can include, for example, an unmanned ground vehicle (UGV) node 108, a group collaboration node 110 in the form of a suitably equipped HUMVEE, and a soldier in the field with a personal digital assistant (PDA), as represented by node 112. In the FIG. 1 example, UGV node 108 is in direct communication with UAV node 106, while PDA node 112 is in indirect communication with UAV node 106 via HUMVEE node 110. In a conventional network such as NCO 100, all anticipated nodes are typically pre-registered by the network manager(s) in a common domain registry, as provided by UAV node 106 in this example.

In general, the pre-registration process involves communication connectivity, frequency coordination, mission planning, and interoperability. For example, in a typical stovepipe communications network such as SATCOM, which can include fixed and mobile nodes, there is generally a known network topology and there are typically network management systems that require a-priori planning before deploying a mission. The a-priori (pre-registration) process can be lengthy and tedious, since it can involve the predetermination of numerous factors, such as frequency coordination, route planning, orbit planning, encryption, time synchronization, and node addressing, as well as others.

In an NCO network operational environment, however, the conventional pre-registration process may not be suitable for a rapidly changing network topology. For example, the dynamic mobility of certain types of nodes can make it difficult to maintain their respective addresses and locations. Any last-minute changes among wireless communication devices in a network can adversely affect the maintainability of frequency coordination and connectivity, for example, and may necessitate communication of last-minute changes to all participants in the network. As communications networks become more complex and more dynamic, the limitations of the conventional pre-registration process can become unacceptable for applications such as a military theater of operation.

A simplified functional scenario can serve to illustrate the interoperability of the pre-registered nodes in NCO 100, as depicted in FIG. 1. In this scenario example, Command and Control (HQ node 102) receives data from satellite node 104 via a suitable wireless link 114 regarding the location of a ground-based target (not shown). Since HQ node 102 can communicate with UAV node 106 via satellite node 104 and a suitable wireless communication link 116, HQ node 102 can access the registry in UAV node 106 to determine the identity, location, mission capability, availability, and/or other characteristics of the pre-registered assets (nodes) in NCO 100. In this example, HQ node 102 may determine that UGV node 108 has the mission capability and location to engage the ground-based target with a relatively high degree of success. For a conventional network such as NCO 100 as noted above, UGV node 108 can be assumed to have pre-registered with UAV 106 via a suitable communication link 118. Similarly, it can be assumed that HUMVEE node 110 has pre-registered with UAV node 106 via a suitable communication link 120, and that PDA node 112 has pre-registered with UAV node 106 via a suitable communication link 122 to HUMVEE node 110 and via communication link 120 to UAV node 106.

In the illustrative scenario of NCO 100, UGV node 108 is typically controlled remotely by PDA node 112 via HUMVEE node 110 and UAV node 106 in order to take advantage of the ground observation capability of the soldier at PDA node 112. HQ node 102 can then send mission instructions to PDA node 112 via satellite node 104, UAV node 106 and HUMVEE node 110. In accordance with the received mission instructions, the soldier at PDA node 112 can activate an appropriate weapon on UGV node 108 by communicating via HUMVEE node 110 and UAV node 106. Moreover, UGV node 108 may be equipped with sensors (e.g., video cameras) that can provide image or other types of data back to the soldier at PDA node 112 (via UAV node 106 and HUMVEE node 110). Similarly, UGV node 108 may provide image or other types of data back to HQ 102 via UAV 106 and satellite 104.

The scenario described above encompasses a group of interoperable, pre-registered nodes functioning interactively in one type of network-centric application; that is, in a military/battlefield environment. The network-centric concept, however, can also be implemented in many other types of network applications, such as homeland security, commercial, industrial, medical, academic, and the like. For some types of network-centric applications, however, the a-priori registration of all anticipated nodes can be a significant limitation to network flexibility. As noted above, in a mobile battlefield NCO, for example, it may not be feasible to anticipate and pre-register every potentially useful asset. Moreover, the typically time-consuming a-priori registration process may not be compatible with the ad-hoc type of dynamic environment envisioned for optimal interoperability. Therefore, a mechanism for entering a node into an NCO environment without a-priori registration can significantly expand the flexibility and versatility of the network.

Figure 2:
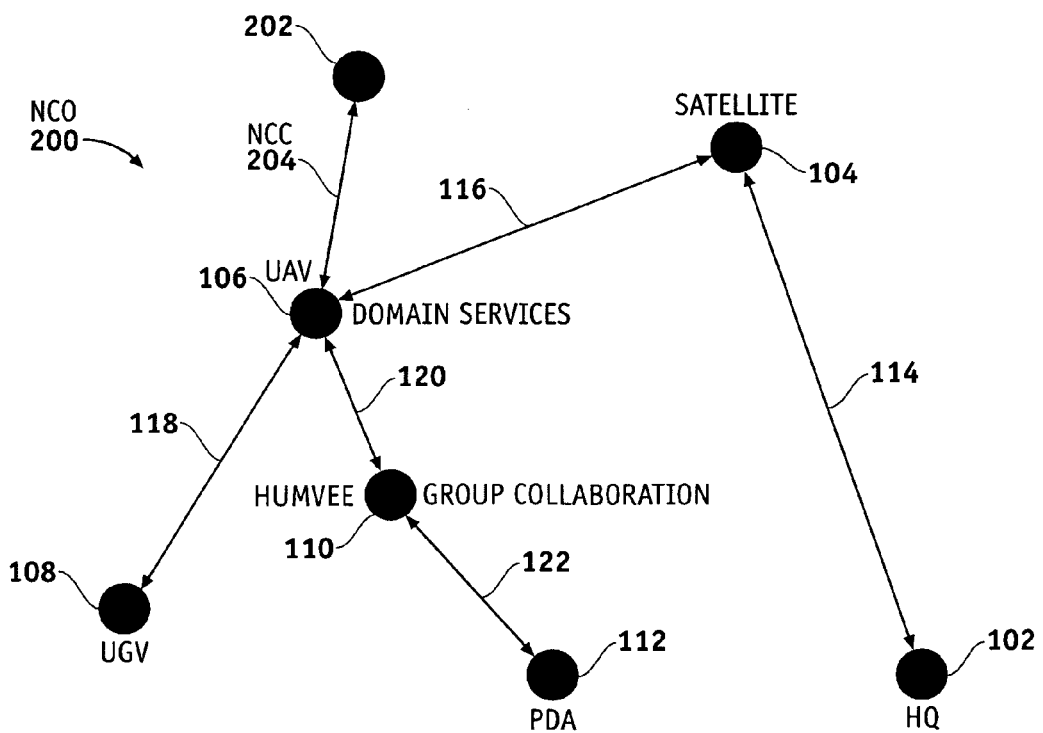
FIG. 2 is an interoperability map of an exemplary embodiment of a network with pre-registered nodes and an ad-hoc unanticipated node.

According to an exemplary embodiment of an ad-hoc implementation (NCO 200) of NCO environment 100, as depicted in FIG. 2, an unanticipated node 202 can be entered into NCO 200 without a-priori registration. Node 202 may be a manned aircraft, a satellite, a joint services command, or any other type of asset capable of communicating with the other nodes in NCO 200, which are shown in FIG. 2 as the same pre-registered nodes as in FIG. 1. To enable node 202 to register "on-the-fly", a dedicated communication channel 204 is typically configured as an ad-hoc registration link between an unanticipated entering node such as 202 and the network registry in UAV node 106. That is, communication channel 204 enables the network registry to perform identification, authentication, and non-repudiation of an entering node (202) during the ad-hoc registration process. The exemplary embodiment of communication channel 204 described herein will be designated as "Net-Centric Coordination Channel" (NCC).

One exemplary embodiment of NCC 204 can be configured as a coordination channel configured with primary and secondary communication frequencies within the Radio Frequency (RF) spectrum. This coordination channel (NCC 204) is typically an open channel that is dedicated within NCO 200 to accommodate only mobile ad-hoc (on-the-fly) node registrations in an analogous manner to the use of VHF/UHF radio guard channels for emergency communications. For example, in certain types of military NCO applications, the NCC 204 coordination channel primary and secondary frequencies would generally be fixed within the UHF spectrum, since the UHF band is commonly used by the military for communicating between various platforms, such as handheld, vehicular, airborne, and maritime. Moreover, future planning for the software-defined radio technology typically includes the UHF band as an embedded waveform for communication. The UHF band is usually well suited for military applications because the behavior of radio signals in this frequency spectrum is generally well understood. However, it will be appreciated that the NCC concept described herein can be applied to other frequency spectra as well, depending on the criteria for a particular application.

In one exemplary embodiment, the primary frequency ($f_1$) of NCC 204 can be used to facilitate initial connectivity, discovery, routing, registration, and service negotiation of an ad-hoc node, and the secondary frequency ($f_2$) of NCC 204 can be used to facilitate overflow and back-up functions. That is, if there are many nodes trying to log on in a mobile ad-hoc environment, primary frequency $f_1$ may become temporarily unavailable. In this case, an entering node could automatically switch over to secondary frequency $f_2$ as a back-up. This type of redundancy feature can be particularly useful in a mission-critical situation such as a battlefield.

An exemplary NCC 204 may be configured to use various data rates and standard communication protocols as appropriate for the application. For example, a vehicular node might gain access using a 64 kbps data rate while a handheld operator node may only have the capability of a 10 kbps throughput. As such, it is desirable for an exemplary NCC 204 to be configured for a broad range of data rates. Similarly, with regard to network communication protocols, an exemplary NCC 204 can be configured to use the current Transmission Control Protocol/Internet Protocol v4 (TCP/IPv4), and can be further configured to have a migration capability for emerging systems such as IPv6, where nodes can generally communicate across a network independent of the types of physical links present in the network. Moreover, an exemplary NCC 204 will generally support a Best Effort level of Quality of Service (QoS).

Typically, the NCC 204 concept disclosed herein will impact the physical and data link layers of a standard communication model such as OSI. That is, the interfacing of an exemplary NCC 204 will typically occur within the physical and data link layers, including the establishment of connectivity, an initial data link, registry, discovery, authentication, and the like. Once an initial registration is achieved using NCC 204, an ad-hoc entering node such as 202 can begin to interoperate with other nodes in NCO 200 by switching over to an operational frequency and using a matching communication standard. This type of ad-hoc registration process is more fully described below in conjunction with the flow diagram of FIG. 3.

Figure 3:
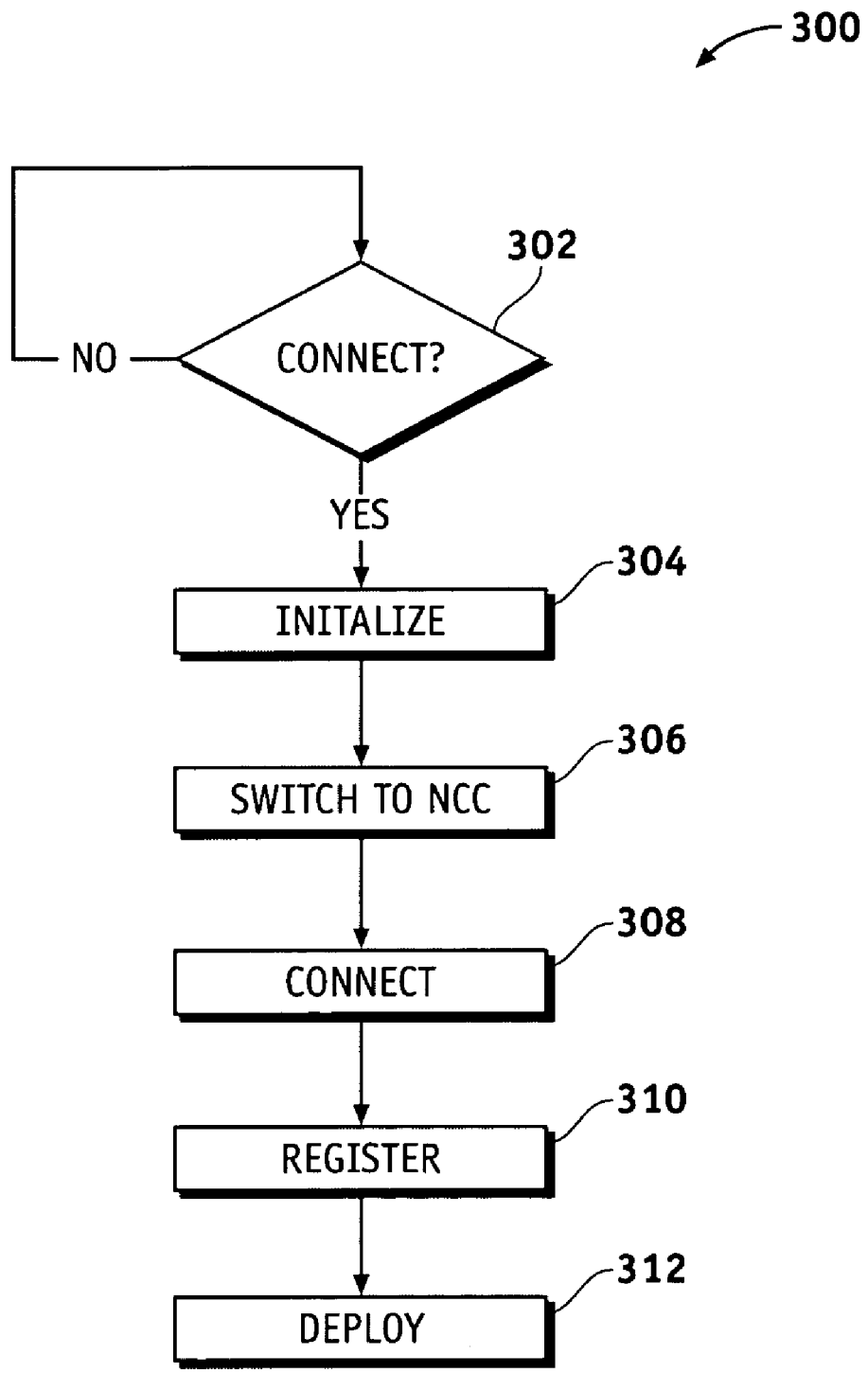
FIG. 3 is a flow diagram of an exemplary embodiment of "on-the-fly" registration between an ad-hoc node and a network.

In FIG. 3, an "on-the-fly" registration process 300 begins in step 302 with a decision by a node (e.g., 202) to join an existing network (e.g., 200) in which the node had not been anticipated or pre-registered. It is assumed that node 202 has a specific IP address, has the appropriate communications frequency capability (e.g., UHF), and also possesses the security and authentication features required to access network 200. If the decision in step 302 is "yes", node 202 initializes the appropriate characteristics for joining the network (step 304), such as those noted above. Node 202 can then make contact with network 200 by switching to the primary frequency of NCC 204 (step 306) and connecting with the network registry (e.g., UAV node 106). As noted above, if primary frequency $f_1$ of NCC 204 is unavailable, node 202 can switch to secondary frequency $f_2$.

In step 308, node 202 enters the registration process by discovering the necessary mission logon information, as well as the authentication, security, and configuration requirements of the network registry. In step 310, node 202 completes the registration process by communicating the required authentication and security information to the network registry (e.g., to UAV node 106 via NCC 204). Finally, in step 312, node 202 can be deployed by switching over to the operational frequency of NCO 200 to enable communication interoperability with the other nodes in NCO 200. This communication interoperability can be implemented through scanning, detecting and negotiating node 202 services via a standard communication protocol.

Accordingly, the shortcomings of the prior art have been overcome by providing an improved registration procedure for nodes connecting with a network. A Net-Centric Coordination Channel (NCC) concept is disclosed herein that provides a mobile ad-hoc network environment with a mechanism to allow nodes that were previously not included in pre-planned missions to join the network in a truly ad-hoc manner. That is, unanticipated nodes can be enabled to register with a network "on-the-fly". As such, these nodes (assets) can be deployed without requiring pre-registration with the network manager. The disclosed NCC concept can provide a dedicated communication link between an entering node and a network registry in order to allow the registry to perform identification, authentication, and non-repudiation of the node during the registration process.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A method of entering a military, battlefield, or homeland security, environment node into a secure ad hoc network environment having an operating channel without a-priori registration of the entering military, battlefield, or homeland security, environment node, the method for use in a military, battlefield, or homeland security environment, the method comprising the steps of:

establishing a registration link between the entering military, battlefield, or homeland security, environment node and a registry within the network environment via a registration channel that is separate from the secure operating channel of the secure network environment, and dedicating selected primary and secondary frequency channels within the Radio Frequency (RF) spectrum;

registering the entering military, battlefield, or homeland security, environment node with the registry via the registration channel link only, wherein the registering step comprises the steps of receiving authentication data from the entering military, battlefield, or homeland security, environment node at the registry via the registration channel, authenticating the registering military, battlefield, or homeland security, environment node at the registry based upon the authentication data, and notifying the registering military, battlefield, or homeland security, environment node of successful registration via the registration channel, and wherein the registering step further comprises identification and non-repudiation of the registering military, battlefield, or homeland security, environment node; and upon successfully registering the military, battlefield, or homeland security, environment node, switching from the registration channel to the secure operating channel of the secure network environment for subsequent communications to thereby allow the registered military, battlefield, or homeland security, environment node to both transmit and receive data on an ad-hoc basis with a plurality of other military, battlefield, or homeland security, environment nodes each operating within the secure network environment using the secure operating channel.

2. The method of claim 1 wherein the dedicated primary and secondary frequency channels are selected within the Ultra High Frequency (UHF) spectrum.

3. The method of claim 1 further comprising the steps of scanning, detecting and negotiating the military, battlefield, or homeland security, environment node services via a standard communication protocol.

4. A system for accommodating "ad-hoc" registration of an unanticipated military, battlefield, or homeland security, environment node with a communications network having a secure operating channel, the system for use in a military, battlefield, or homeland security environment, the system comprising:

a network registry within the communications network; and a registration channel link different from the secure operating channel of the communications network that is configured to link the network registry and the unanticipated military, battlefield, or homeland security, environment node, wherein the registration channel is comprised of a dedicated primary frequency and a dedicated secondary frequency both selected within the Radio Frequency (RF) spectrum;

wherein the unanticipated military, battlefield, or homeland security, environment node is registered "on-the-fly" via the registration channel link, and wherein the unanticipated military, battlefield, or homeland security, environment node configured to switch from the registration channel link to the secure operating channel only after successfully registering with the network registry to thereby allow the unanticipated military, battlefield, or homeland security, environment node to subsequently interoperate with on an ad-hoc basis with other military, battlefield, or homeland security, environment nodes operating on the communications network by sending and receiving data using the secure operating channel, and wherein the "on-the-fly" registration comprises identification and non-repudiation of the unanticipated military, battlefield, or homeland security, environment node.

5. The system of claim 4 wherein the registration channel is comprised of a dedicated primary frequency and a dedicated secondary frequency.

6. The system of claim 5 wherein the dedicated primary and secondary frequencies are selected in the Radio Frequency (RF) spectrum.

7. The system of claim 4 wherein the dedicated primary and secondary frequencies are selected within the Ultra High Frequency (UHF) spectrum.

8. The system of claim 4 wherein the deployment of the unanticipated military, battlefield, or homeland security, environment node comprises scanning, detecting and negotiating the military, battlefield, or homeland security, environment node services via a standard communication protocol.

9. A method of joining a communicating military, battlefield, or homeland security, environment node to a secure ad-hoc network having a network registry without a-priori registration with the secure ad-hoc network, the method for use in a military, battlefield, or homeland security environment, the method comprising the steps of:

establishing a registration link from the communicating military, battlefield, or homeland security, environment node to the network registry via a registration channel that is separate from a secure operating channel of the ad-hoc network, wherein the registration channel is comprised of a dedicated primary frequency and a dedicated secondary frequency both selected within the Radio Frequency (RF) spectrum;

registering the communicating military, battlefield, or homeland security, environment node via the registration link only and identifying and non-repudiating the communicating military, battlefield, or homeland security, environment node; and upon successful registration, ceasing communication via the registration channel and subsequently deploying the communicating military, battlefield, or homeland security, environment node on the secure operating channel of the ad-hoc network to thereby allow the communicating military, battlefield, or homeland security, environment node to send and receive data on an ad-hoc basis with other military, battlefield, or homeland security, environment nodes operating via the secure operating channel.

10. The method of claim 9 wherein the ceasing and deploying step comprises switching over from a registration frequency associated with the registration link to an operational frequency associated with the ad-hoc network that is different from the registration frequency.

* * * * *